(12) United States Patent
Carrier et al.

(10) Patent No.: US 6,903,640 B2
(45) Date of Patent: Jun. 7, 2005

(54) APPARATUS AND METHOD OF USING THE STATOR COILS OF AN ELECTRIC MOTOR TO MAGNETIZE PERMANENT MAGNETS OF THE MOTOR ROTOR WHEN THE SPAN OF EACH STATOR COIL IS SMALLER THAN THE WIDTH OF EACH PERMANENT MAGNET POLE

(75) Inventors: Mark E. Carrier, Wildwood, MO (US); Alan P. Crapo, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 34 days.

(21) Appl. No.: 10/269,267

(22) Filed: Oct. 11, 2002

(65) Prior Publication Data

US 2004/0070361 A1 Apr. 15, 2004

(51) Int. Cl.$^7$ .............................................. H01F 13/00
(52) U.S. Cl. ...................................... 335/284; 361/143
(58) Field of Search ........................ 335/284; 361/139, 361/143, 146, 147, 148

(56) References Cited

U.S. PATENT DOCUMENTS

| | | | | |
|---|---|---|---|---|
| 3,678,436 A | * | 7/1972 | Herdrich et al. | 335/284 |
| 4,748,535 A | * | 5/1988 | Arawaka et al. | 361/148 |
| 5,075,814 A | * | 12/1991 | Kubota et al. | 361/143 |
| 5,424,902 A | * | 6/1995 | Shida et al. | 361/148 |
| 6,084,496 A | * | 7/2000 | Asano et al. | 335/284 |
| 6,232,862 B1 | * | 5/2001 | Asano et al. | 335/284 |
| 6,380,654 B1 | | 4/2002 | Dokonal et al. | |

FOREIGN PATENT DOCUMENTS

| | | |
|---|---|---|
| DE | 3138052 A1 | 4/1983 |
| EP | 0 800 257 A1 | 8/1997 |

* cited by examiner

*Primary Examiner*—Bentsu Ro
(74) *Attorney, Agent, or Firm*—Thompson Coburn, LLP (57) ABSTRACT

An apparatus and its method of use enable magnetizing the permanent magnets of an electric motor rotor using the winding coils of the motor stator when the circumferential width of each rotor permanent magnet pole is larger than the circumferential width of each stator winding coil.

22 Claims, 4 Drawing Sheets

Magnetizing IPM Rotors Using Single Tooth Wound Stators
Angles of Rotor Rotation for Two Step Process
(18 slots or less)

| Slot/pole Ratio | Slots | Poles | Method 1 – Connect A to B for 1st shot C to B for 2nd shot | Method 2 – Connect A to B for 1st shot Reverse polarity for 2nd shot | Method 2 – Valid Values of n | Method 3 – Connect A to B for 1st shot Same polarity for 2nd shot | Method 3 – Valid Values of n |
|---|---|---|---|---|---|---|---|
| General Formula | | | Angle = 120 / poles | Angle = +/- n*360 / poles (n = odd interger) | | Angle = +/- n*360 / poles (n = even interger) | |
| 1.5 | 6 | 4 | 30 | +/- 90 | 1 | none | – |
|  | 9 | 6 | 20 | +/- 60, 180 | 1, 3 | none | – |
|  | 12 | 8 | 15 | +/- 45, +/- 135 | 1, 3 | none | – |
|  | 15 | 10 | 12 | +/- 36, +/- 108, 180 | 1, 3, 5 | none | – |
|  | 18 | 12 | 10 | +/- 30, +/- 90, +/- 150 | 1, 3, 5 | none | – |
| 1.2857 | 18 | 14 | 8.5714 | +/- 128.5714 | 5 | +/- 51.429 | 2 |
| 1.2 | 12 | 10 | 12 | +/- 108 | 3 | +/- 72 | 2 |
| 1.125 | 9 | 8 | 15 | +/- 135 | 3 | 180 | 4 |
|  | 18 | 16 | 7.5 | +/- 67.5, +/- 112.5 | 3, 5 | +/- 90 | 4 |
| 1.0714 | 15 | 14 | 8.57143 | +/- 128.5714, 180 | 5, 7 | +/- 154.286 | 6 |

APPARATUS AND METHOD OF USING THE STATOR COILS OF AN ELECTRIC MOTOR TO MAGNETIZE PERMANENT MAGNETS OF THE MOTOR ROTOR WHEN THE SPAN OF EACH STATOR COIL IS SMALLER THAN THE WIDTH OF EACH PERMANENT MAGNET POLE

BACKGROUND OF THE INVENTION (1) Field of the Invention

The present invention pertains to an apparatus and method for magnetizing the permanent magnets of an electric motor rotor using the winding coils of the motor stator when the circumferential width of each rotor permanent magnet pole is larger than the circumferential width of each stator winding coil.

(2) Description of the Related Art

Variable speed electric motors are often constructed with rotor assemblies that include a plurality of permanent magnets that are secured to the motor rotor. One or more of the magnets make up each of the poles of the rotor. The permanent magnets are spatially arranged on the rotor around the rotor axis of rotation and each magnet typically extends along the axially length of the rotor. When the magnets are secured to the rotor the magnets often are not polarized and have no magnetic polarity. This is done to facilitate the assembly of the rotor into the motor stator.

The typical stator is comprised of a plurality of metal laminate plates, each having a plurality of stator poles formed in the plate. The laminate plates are stacked with the poles aligned to form the stator core. Multiple lengths of wire are wound around the stator poles forming stator coils around each of the poles. With the stator basically being entirely constructed of metal, assembly of a permanent magnet rotor into the stator core where the permanent magnets have previously been polarized is a difficult operation. The polarization of the rotor magnets draws the rotor to the stator poles and coils making assembly difficult. Because of this, it was found that assembling a permanent magnet rotor into the interior bore of a stator prior to the permanent magnets being polarized was a much more efficient method of assembly. In addition, by not polarizing the permanent magnets of the rotor prior to its assembly into the stator core, contamination problems associated with a rotor that has been magnetized prior to assembly in the stator are eliminated.

Once the permanent magnet rotor has been assembled into the interior bore of the stator the permanent magnets of the rotor are polarized. This is accomplished by passing a polarizing electric current through the coils of the stator. In the magnetization process of the rotor permanent magnets using the coils of the stator, it is necessary that the rotor be properly positioned relative to the stator coils. In the prior art magnetization process, the stator and rotor would be held stationary relative to each other by a separate support base. The coils of the stator are then connected electrically to a magnetizer. The rotor is held stationary by the support base relative to the stator coils in a position where the middle of the circumferential width of each rotor permanent magnet is in line with the lines of the magnetic field produced by the polarizing electric current passed through the stator coils. This ensures that each permanent magnet of the rotor is sufficiently polarized. In the prior art method of polarizing the permanent magnets of the motor, a magnetizing or polarizing electric current is passed through each of the stator coils simultaneously, resulting in the simultaneous magnetization of each of the rotor permanent magnets.

Examples of prior art methods of employing the stator winding coils of an electric motor to magnetize the rotor permanent magnets similar to that discussed above are disclosed in the U.S. patents of Shida et al., U.S. Pat. No. 5,424,902; Asano et al., U.S. Pat. No. 6,084,496; and Asano et al., U.S. Pat. No. 6,232,862.

However, the prior art magnetizing procedure discussed above required that the circumferential width or circumferential span of each of the stator winding coils of the electric motor be larger than the circumferential width or circumferential span of each of the rotor permanent magnet poles. The larger coil size relative to the size of the permanent magnet pole was necessary to ensure that the magnetic field produced by the polarizing current passed through the stator coils was sufficiently large to sufficiently polarize the permanent magnet pole. Problems are encountered in electric motor constructions where the circumferential width or circumferential span of the stator winding coils is smaller than the circumferential width or circumferential span of each of the rotor magnet poles. In such situations each stator coil is too small to produce a magnetic field that is sufficiently large to entirely encompass a rotor magnet pole and sufficiently polarize the magnet(s) of the rotor pole.

SUMMARY OF THE INVENTION

The present invention overcomes the problems of magnetizing permanent magnets of an electric motor rotor discussed above by providing an apparatus and method for magnetizing permanent magnets of a motor rotor where the rotor magnet poles have a larger circumferential width dimension than that of the stator winding coils of the electric motor.

The apparatus of the invention employs a support base similar to that of the prior art that supports the stator of the electric motor in a stationary position. The support base also has a support for the rotor of the electric motor that maintains the rotor in a desired position relative to the stator with the rotor permanent magnets positioned in the stator core. The apparatus of the invention also employs a magnetizer similar to that of the prior art that provides electric current to the winding coils of the stator.

The apparatus of the invention differs from prior art apparatus employed in magnetizing the permanent magnet rotors of an electric motor in that it employs a motive device operatively connected with the rotor for moving the rotor to desired positions of the rotor relative to the stator. The motive device could move the rotor manually, or by a servo motor, or by a solenoid rod operated mechanism that transforms linear movement of the solenoid rod into rotational movement of the rotor through a prescribed angle, but in the preferred embodiment is an electric stepper motor. In addition, a position sensor is employed that senses the position of the motor rotor and movement of the rotor from a first position of the rotor to a second position of the rotor. The stepper motor and the position sensor communicate with a motor control system that controls the motor to move the rotor relative to the stator between the first and second positions of the rotor relative to the stator in the preferred embodiment of the invention. The stepper motor control system also communicates with the magnetizer and controls the magnetizer to deliver magnetizing, or polarizing electric current to the stator coils. The magnetizer also functions as a source of supplying an electric current to the stator coils to produce a reluctance torque in the electric motor. The apparatus of the invention also employs a magnetic flux sensor and flux meter that are operatively connected to the stator and are used in determining the sufficiency of the rotor permanent magnet magnetization.

In practicing the method of using the apparatus of the invention for polarizing the permanent magnets of an electric motor, the electric motor is first mounted to the support base of the apparatus which holds the stator stationary. The stepper motor is operatively connected to the rotor shaft of the electric motor. With the stator held stationary by the support base of the apparatus, the rotor shaft in the stator core is positioned relative to the motion sensor where the motion sensor can determine the angular movement of the rotor shaft relative to the stator. In addition, with the stator secured in the support base and the rotor positioned in the stator core, the magnetic flux sensor and its associated flux meter are electrically connected to the stator winding coils of the electric motor so that they can measure a magnetic flux produced by the electric motor upon rotation of the rotor in the stator once the permanent magnets of the rotor are sufficiently magnetized.

The stator coils of the electric motor are connected with the magnetizer to enable the magnetizer to supply an electric current to the stator coils. In initializing the method of the invention, the magnetizer first functions as a current source and supplies an electric current to the stator coils to produce a reluctance torque in the electric motor. The reluctance torque causes the rotor in the stator core to rotate to a first position of the rotor relative to the stator. This first position is sensed by the position sensor which provides a signal to the stepper motor control system indicating that the rotor has been positioned in its first position relative to the stator.

Following receipt by the stepper motor control system of the position sensor signal, the motor control system signals the magnetizer and controls the magnetizer to supply a first magnetizing electric current to the stator coils of the motor stator. The magnetizing current sent to the stator coils magnetizes a portion of each of the rotor permanent magnet poles. The first magnetizing current is supplied to the stator coils for a set period of time, following which the supply of current to the stator by the magnetizer is stopped. The magnetizer then provides a signal to the stepper motor control system that the permanent magnet poles of the rotor in the rotor first position relative to the stator have been partially magnetized.

When the stepper motor control system receives the signal from the magnetizer indicating that the first magnetizing step has been completed, the stepper motor control system then controls the stepper motor to rotate the rotor in the stator core to a second position of the rotor relative to the stator. When the rotor has been moved to the second position of the rotor, the rotor position sensor provides a signal to the stepper motor control system that in turn controls the stepper motor to stop the rotation of the rotor in the stator.

With the rotor having been moved to its second position relative to the stator by the stepper motor, and with the position sensor having provided a signal to the stepper motor control system that the rotor is now in its second position relative to the stator, the stepper motor control system provides a signal to the magnetizer controlling the magnetizer to supply a second magnetizing electric current to the stator coils of the motor. The second magnetizing current sent to the stator coils magnetizes the remaining portions of each of the rotor permanent magnet poles. The magnetizer provides the second magnetizing electric current to the stator coils for a set period of time, and then stops the supply of the electric current and provides a signal to the stepper motor control system indicating that the second magnetizing operation has been completed. This completes the two-step magnetization of all of the permanent magnets of the electric motor rotor.

Upon completion of the second magnetizing step, the stepper motor control system provides a signal to the stepper motor that causes the motor to rotate the rotor, now with polarized permanent magnets, in the stator core. On rotation of the rotor in the stator core, a magnetic flux is produced by the electric motor. This magnetic flux is sensed by the flux meter which provides a signal to the control system indicative of the flux measured. The flux meter also provides a visual indication on whether or not the rotor permanent magnets of the electric motor have been sufficiently magnetized.

The apparatus and its method of use described above enable the magnetization of rotor permanent magnets in an electric motor in which the circumferential width dimension of each of the permanent magnet poles is larger than the circumferential width dimension of each of the stator coils.

BRIEF DESCRIPTION OF THE DRAWINGS

Additional features of the invention are set forth in the following detailed description of the preferred embodiment of the invention and in the drawing figures wherein:

FIGS. 3A and 3B are schematic representations of the three phase stator windings for the stator of FIGS. 2A and 2B; and, FIG. 4 is a table illustrating different variations of the method of the invention employed in magnetizing the permanent magnets of rotors of various different types of electric motors having different stator slot to rotor pole ratios.

DETAILED DESCRIPTION OF THE PREFERRED EMBODIMENTS

The apparatus of the invention and its method of use are specifically designed to magnetize or polarize permanent magnets of a rotor of an electric motor where the circumferential width dimension of each of the permanent magnet poles is larger than the circumferential width dimension of each of the stator coils of the electric motor. Each of the rotor permanent magnet poles could be comprised of one or more permanent magnets. Electric motors of this type can have a variety of different constructions, for example a motor having a six slot stator with a four pole rotor, or an electric motor with a nine slot stator with a six pole rotor. To accommodate the different constructions of electric motors possible, the apparatus of the invention may be employed in performing three variant methods of the invention that can be used in the magnetization of the permanent magnets of electric motors of almost any configuration where the rotor permanent magnet poles have a larger circumferential width dimension than the circumferential width dimension of the motor's stator coils.

Figure 1:
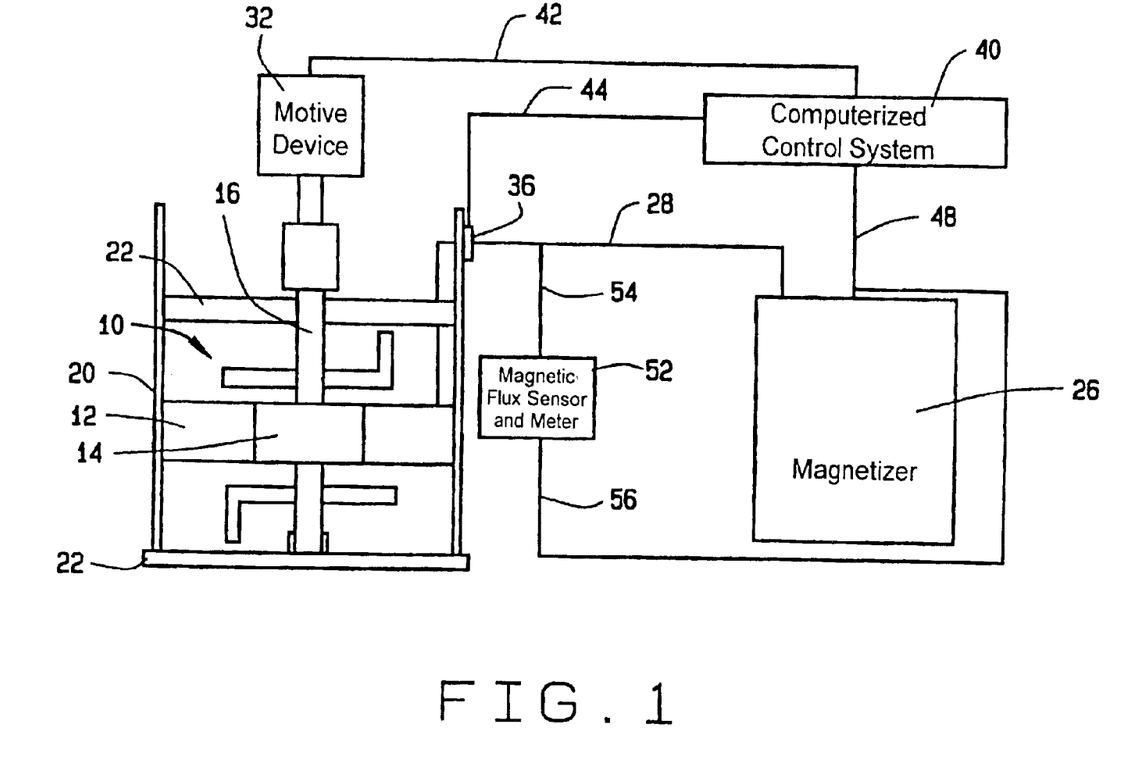
FIG. 1 is a schematic representation of the apparatus of the invention.

FIG. 1 shows a schematic representation of the apparatus of the invention. The apparatus of the invention makes use of known component parts combined in a novel arrangement to produce the apparatus of the invention. Because the component parts of the apparatus are known, they are only represented schematically in FIG. 1 to simplify the explanation of the apparatus of the invention.

In the schematic representation of FIG. 1 the electric motor 10 is shown comprised of a stator 12 having a plurality of stator winding coils arranged around a rotor 14 of the motor. The rotor 14 is mounted on the motor shaft 16 and is comprised of a plurality of substantially identical permanent magnets that are secured to and circumferentially arranged around the rotor 14. At the time the electric motor 10 is assembled into the apparatus of the invention, the material of the rotor permanent magnets has not yet been magnetized. In the illustrative environment of the invention, the electric motor 10 is a brushless permanent magnet motor. Furthermore, the motor 10 is an internal permanent magnet motor with the magnets being mounted on the rotor 14 and the rotor being surrounded by the stator 12. It should be understood that the electric motor 10 is only one type of motor with which the apparatus and method of the invention may be used. The apparatus and method of the invention are equally well suited for magnetizing the permanent magnets of various other different types of motor constructions, for example external rotor motors where the stator of the motor is surrounded by a rotor drum with the permanent magnets mounted on the interior surface of the rotor drum.

The apparatus of the invention employs a support base 20 similar to that of the previously described prior art support base that supports the stator 12 of the electric motor in a stationary position in the support base. The support base 20 is a generally cylindrical structure that engages around the circumference of the stator 12 to hold the stator in a stationary position. The support base 20 also has supports 22 for the rotor 14 of the electric motor that maintain the rotor in a desired position relative to the stator with the rotor permanent magnets positioned in the stator core where they are surrounded by the winding coils of the stator.

The apparatus of the invention also employs a magnetizer 26 that is similar to prior art magnetizers. The magnetizer is connected in electric communication with the stator winding coils of the electric motor 10 by a system of electrical conductors 28. The magnetizer has three or two lead connection capability, and in the illustrative embodiment employs three leads among the electrical conductors 28 that communicate with three phases of the stator winding coils of the electric motor 10. The magnetizer 26 of the apparatus of the invention differs from prior art magnetizers in that not only is it designed to provide a magnetizing electric current to the coils of the stator 12 of the electric motor 10 held in the support base 20, but it is also designed to provide a separate level of electric current that is supplied to the windings coils of the stator 12 to produce a reluctance torque on the rotor 14 of the electric motor. This second level of electric current is also delivered to the stator winding coils through the electrical conductors 28 of the magnetizer.

The apparatus of the invention also differs from prior art apparatus employed in magnetizing the permanent magnet rotors of electric motors in that it employs a motive device 32. The motive device 32 is provided to selectively move the motor shaft 16 through a prescribed angle at one stage of the method of the invention and to rotate the motor shaft at another stage of the method of the invention. The motive device 32 could be a manually operated device connected to the motor shaft 16, or a servo motor operatively connected to the motor shaft, or a solenoid operated mechanism that transforms linear movement of a rod of the solenoid into rotational movement of the rotor through a prescribed angle, or other similar device that could impart rotation to the motor shaft. However, in the preferred embodiment of the invention, the motive device 32 is an electric stepper motor. The stepper motor 32 is operatively connected with the motor shaft 16 for rotating the rotor 14 to desired positions relative to the stator 12, and for rotating the rotor 14 in the core of the stator 12 as will be explained.

A position sensor 36 is mounted on the support base 20 in a position adjacent the motor stator 12. The position sensor 36 senses the position of the rotor shaft 16 and produces signals indicative of the precise rotational position of the shaft 16 and rotor 14 in the core of the stator 12. The means by which the sensor senses the position of the shaft can be a direct coupling between the sensor and the shaft, or could be provided by a mechanical linkage such as a series of gearing or by other equivalent means, or the position sensor could be a photo sensor.

A computerized control system 40 communicates with the stepper motor 32 through a series of electrical conductors 42. The control system 40 also communicates with the position sensor 36 through a series of electrical conductors 44. The control system 40 controls the stepper motor 32 to rotate the shaft 16 and rotor 14 relative to the stator 12. Operation of the control system 40 is controlled by signals received from the position sensor 36 that provides the control system 40 with information on the position of the motor shaft 16 and rotor 14 relative to the stator 12. By employing a stepper motor 32, the control system 40 can control operation of the motor to move the motor shaft 16 and rotor 14 through arc segments that are fractions of one complete rotation of the rotor relative to the stator as sensed by the position sensor 36, or can rotate the rotor 14 in the core of the stator 12 for several revolutions of the rotor. As explained earlier, other means for rotating the rotor 14 could also be used, for example by manual rotations, or by a servo motor, or by a solenoid. According to the method of the invention to be explained, the control system 40 controls the stepper motor 32 to rotate the motor shaft 16 and rotor 14 through an arc segment from a first position of the rotor 14 relative to the stator 12 sensed by the position sensor 36, to a second position of the rotor 14 relative to the stator 12 also sensed by the position sensor 36.

The computerized control system 40 also communicates with the magnetizer 26 through a system of electrical conductors 48. The computerized control system 40 controls the magnetizer 26 to deliver electric current to the stator winding coils of the stator 12.

The apparatus of the invention also employs a magnetic flux sensor and flux meter 52 that are operatively connected to the fixture 20 and are connectable to the stator to sense a level of magnetic flux generated by the rotation of the rotor 14 in the stator 12 following magnetization of the rotor's permanent magnets. A series of electrical conductors 54 operatively communicate the flux sensor 52 with the conductors 28 connected to the winding coils of the stator. An additional series of electrical conductors 56 operatively communicate the magnetic flux sensor 52 with the magnetizer 26.

There are three methods of employing the apparatus of the invention described above in magnetizing rotor permanent magnets of an electric motor.

In practicing the method of the invention using the apparatus of the invention shown in FIG. 1, the electric motor 10 is first mounted to the support base 20 of the apparatus which holds the motor stator 12 stationary. The stepper motor 32 is operatively connected to the shaft 16 of the motor rotor 14. With the motor mounted in the support base 20 the position sensor 36 is able to sense the position of the shaft 16 and the rotor 14 relative to the stator 12. The electrical conductors 28 of the magnetizer 26 are connected to the stator winding coils. This also connects the electrical conductors 54 of the flux sensor and meter 52 to the stator winding coils of the electric motor.

Figure 2A:
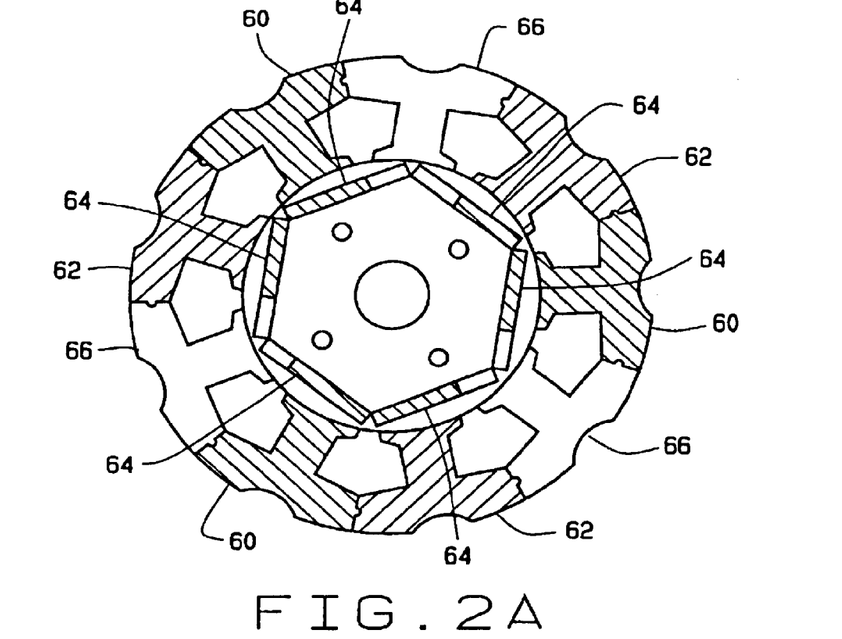
FIGS. 2A and 2B are schematic representations of the 2-stage method of employing the apparatus of the invention in polarizing permanent magnets of a rotor of an electric motor.
Figure 2B:
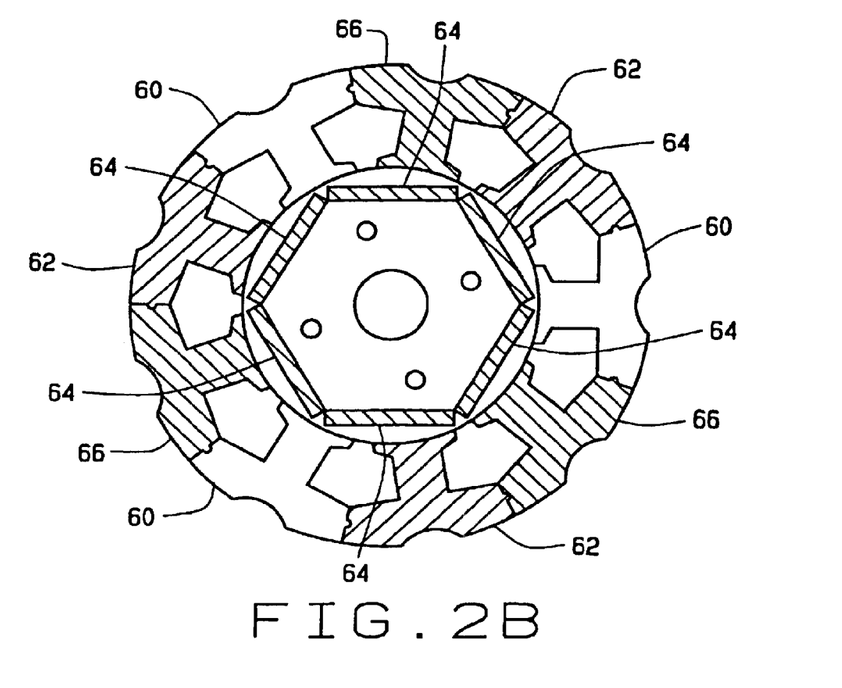
Figure 3A:
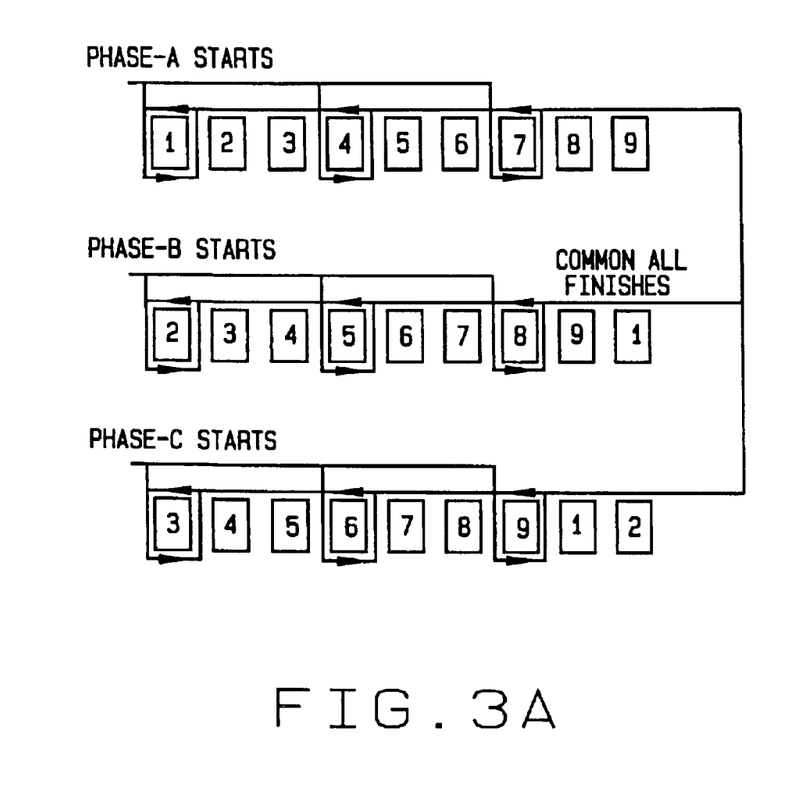
Figure 3B:
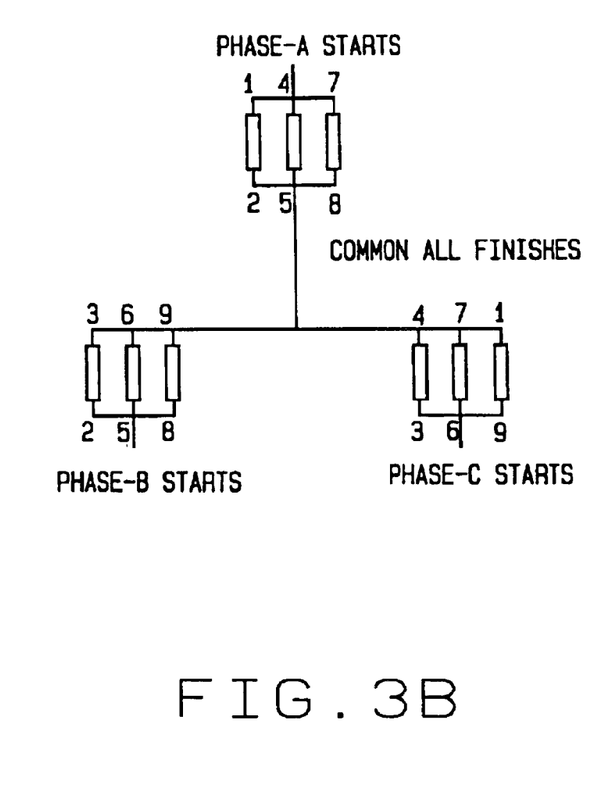

The method of the invention involves a two step process in magnetizing the permanent magnets of the rotor 14. FIGS. 2A and 2B schematically illustrate the two step method of the invention being applied to an electric motor having nine stator slots and six rotor poles. FIGS. 3A and 3B show schematic representations of the three phase winding coils of a nine stator slot motor. The three phases of the stator winding coils include the coils of Phase A, the coils of Phase B and the coils of Phase C as shown in FIG. 3A. The stator coils of each of the three phase windings of the electric motor are connected through the magnetizer electrical conductors 28 with the magnetizer 26 to enable the magnetizer to supply electric current to the stator coils. In initializing the method of the invention, the control system 40 controls the magnetizer 26 to first function as a source of electric current supplied to the stator coils to produce a reluctance torque in the electric motor 10. The rotor 14 is not held stationary by the stepper motor 32 and is free to rotate in the stator core. An electric current pulse output of the magnetizer 26 is applied to the Phase C stator coils with the ground connection to the Phase A and Phase B stator coils. The reluctance torque causes the rotor 14 and the motor shaft 16 to rotate in the stator core to a first position of the rotor relative to the stator. This first position of the rotor 14 is sensed by the position sensor 36 which sends a signal to the control system 40 that indicates that the rotor has been positioned in its first position relative to the stator. The control system now controls the stepper motor 32 to hold the rotor in the first position When the control system 40 receives the signal from the position sensor 36 indicating that the rotor is in its first position relative to the stator, the control system 40 then sends a signal to the magnetizer 26 that controls the magnetizer to supply a first magnetizing electric current to the stator coils of the motor stator. In this first step of the magnetizing process the magnetizer 26 sends electric current through only the coils of Phase A and Phase B of the stator 12. In the preferred embodiment the magnetizing voltage is 1000V. This first step in the magnetization of the permanent magnet poles is shown in FIG. 2A where the Phase A coils 60 and Phase B coils 62 that are supplied with the magnetizing electric current are shown shaded. This first magnetizing current sent to the Phase A 60 and Phase B 62 stator coils magnetizes a portion of each of the rotor permanent magnet poles 64 shown shaded in FIG. 2A. This first magnetizing current supplied to the Phase A 60 and Phase B 62 stator coils of the motor stator continues for a set period of time controlled by the control system 40 following which the control system sends a signal to the magnetizer 26 controlling it to stop the supply of electric current to the Phase A 60 and Phase B 62 coils. This completes the first stage of magnetizing the permanent magnets 64 of the rotor with the magnet poles being partially magnetized as shown in FIG. 2A.

Following completion of the first stage of magnetizing the permanent magnets, the control system 40 then controls the stepper motor to rotate the rotor 14 in the core of the stator 12 clockwise from the electric lead end of the motor to a second position of the rotor relative to the stator shown in FIG. 2B. The rotation of the rotor in the stator is sensed by the position sensor 36 which sends a signal to the control system 40 when the rotor has been moved to its second position relative to the stator. Upon receiving the signal from the position sensor 36, the control system 40 then controls the stepper motor 32 to stop rotation of the rotor 14 in the stator 12.

Figure 4:
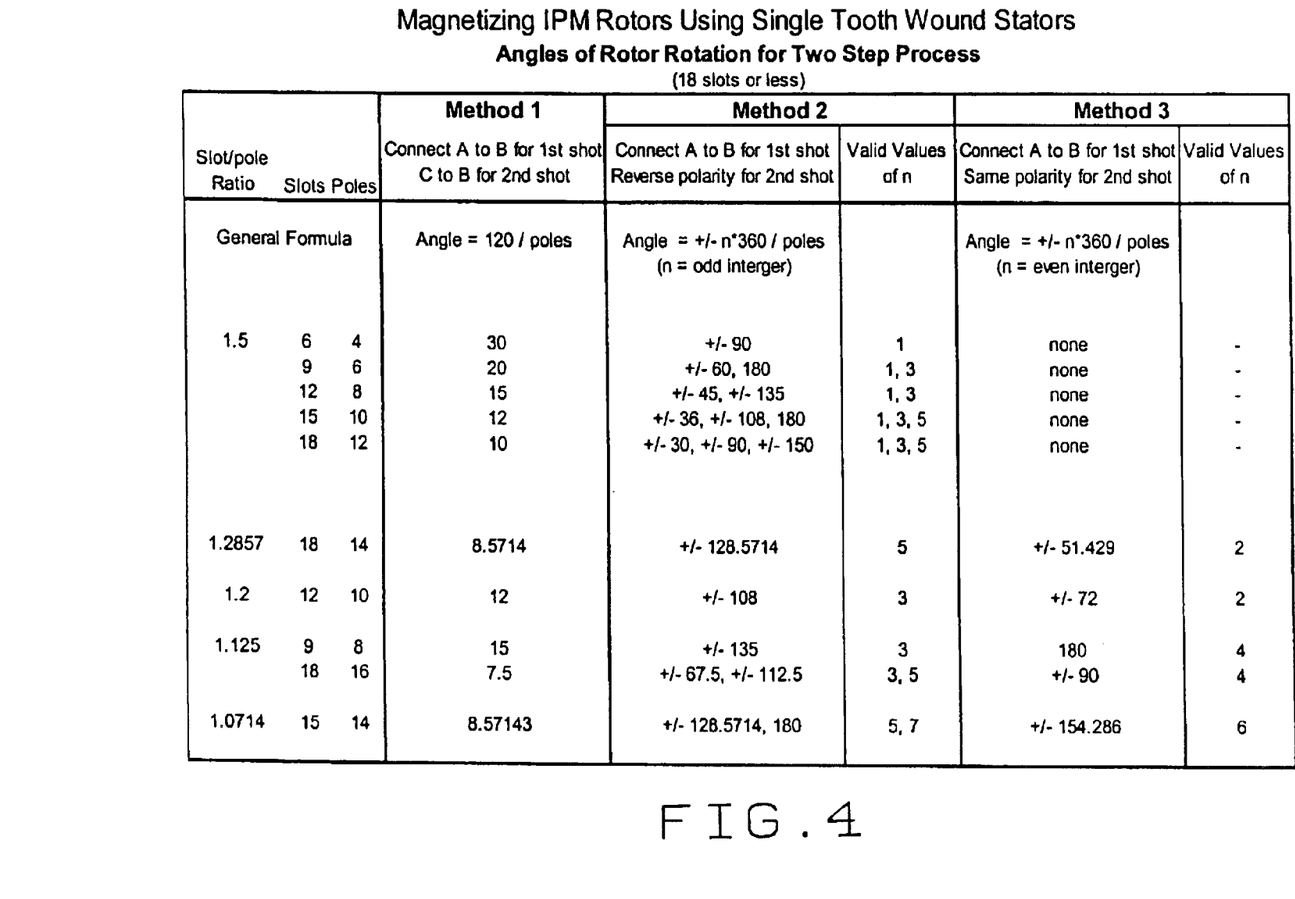

According to the first method of the invention, the stepper motor 32 is controlled to rotate the rotor 14 clockwise through an angle relative to the stator 12 where the angle is determined depending on the number of slots and poles of the particular motor being magnetized. FIG. 4 provides a table showing the angle between the first and second rotor positions of the first method of the invention through which the rotor is rotated depending on the numbers of slots and poles of the motor. In the example of FIG. 2A, the motor has nine stator slots and six rotor poles. Referring to FIG. 4, in the first method of the invention the angle through which the rotor is rotated is determined by dividing 120 by 6, the number of rotor poles. This gives the angle of rotation of twenty degrees. Therefore, according to the first method of the invention for the particular motor having nine stator slots and six rotor poles, the rotor is rotated twenty degrees clockwise from the first position of the rotor relative to the stator shown in FIG. 2A to the second position of the rotor relative to the stator shown in FIG. 2B. Different ratios of the numbers of stator slots and rotor poles are given in the left hand column of the table of FIG. 4. For each of these stator slot and rotor pole ratios, the angle through which the rotor is rotated relative to the stator from position 1 of the rotor to position 2 of the rotor is determined by dividing 120 by the number of rotor poles.

When the control system 40 receives the signal from the position sensor 36 that the rotor has been rotated to its second position, the control systems then controls the stepper motor 32 to stop rotation of the rotor and hold the rotor in the second position. The control system then communicates with the magnetizer 26 controlling the magnetizer to supply a second magnetizing electric current to the stator coils of the motor. However, in the second stage of this first method of the invention, the magnetizer provides magnetizing electric current to the stator coils of Phase C 66 and the stator coils of Phase B 62. This is shown schematically in FIG. 2B where the stator coils of Phase C 66 and Phase B 62 being supplied the magnetizing electric current are shown shaded. The second magnetizing current sent through the Phase C 66 and Phase B 62 coils magnetizes the remaining portions of each of the rotor permanent magnet poles 64 as represented in FIG. 2B. The magnetizer provides the second magnetizing electric current to the stator coils for a set period of time monitored by the control system 40, after which the control system controls the magnetizer 26 to cease the supply of magnetizing current to the coils. This completes the two step magnetization of all of the permanent magnets of the electric motor rotor.

Upon completion of the second magnetizing stage, the control system 40 controls the stepper motor 32 to slowly rotate the rotor 14 within the stator coil 12. In the preferred embodiment the rotation of the rotor is less than 100 RPM. The rotating rotor 14, now with magnetized permanent magnets, in the stator core 12 produces a magnetic flux that is sensed by the flux sensor and meter 52. A signal representative of the sensed magnetic flux is sent by the flux sensor and meter 52 to the control system 40 which, depending on the sensed magnetic flux, determines if the permanent magnets have been sufficiently magnetized. Thus, the apparatus of the invention operated according to this first method of the invention magnetizes rotor permanent magnets in a motor having magnet poles with a larger circumferential width dimension than the circumferential width dimension of the motor stator coils, and then senses a magnetic flux produced by rotating the magnetized rotor in the stator core to determine that the magnetization process is sufficient to magnetize the magnets of the rotor.

The table of FIG. 4 represents two other methods of the invention. In all methods of the invention, the permanent magnets of the rotor are magnetized in a two step process as described earlier. The difference between the alternative methods of the invention is in the manner in which the angle through which the rotor is rotated from its first position of the magnetizing process to its second position of the magnetizing process is determined. In addition, the electric current supplied by the magnetizer 26 to the phases of the stator coils is different for the two magnetization stages of the alternate methods of the invention.

Referring to FIG. 4, in the second method of the invention the magnetizer is connected to the stator coils of Phase A and Phase B of the motor for the first stage of the magnetization method. The magnetizer 26 provides an electric current to the stator coils to produce a reluctance torque on the rotor that moves the rotor to its first position relative to the stator. The magnetizer 26 is then controlled to provide the first magnetizing current to the coils of Phase A and Phase B. When the first magnetizing stage is completed, the rotor is rotated through an angle relative to the stator determined from the equation: Angle=+/−n×360/poles, where n is an odd integer from the group of integers consisting of one, three, five and seven. The electric current passed through the Phase A and Phase B coils magnetizes the poles or permanent magnets of the rotor with several of the magnets being completely magnetized and others of the permanent magnets being partially magnetized. Following this first magnetizing step, the rotor 14 is rotated relative to the stator 12 through the angle determined from the equation of method 2 set forth above and shown in the table of FIG. 4.

Following rotation of the rotor, the magnetizer is controlled to provide the second magnetizing current to the stator coils. According to the second method of the invention, the second magnetizing current is again provided to the coils of Phase A and Phase B, but in a reverse polarity with the second electrical current passing through the coils of Phase B and the coils of Phase A. This second magnetizing current completely magnetizes the magnets of the rotor. Again, following magnetization of the rotor magnets, the rotor is rotated in the stator core so that its magnetic flux can be measured to determine the sufficiency of the magnetization process.

The third method of the invention is also shown in the table of FIG. 4. It is similar to the second method in that the rotor 14 is rotated relative to the stator 12 from the first position of the rotor to the second position of the rotor through an angle determined from the equation: Angle=+/−n×360/poles. However, in this equation n is an even integer from the group of integers consisting of 2, 4 and 6. Furthermore, this method of the invention is employed in specific electric motor constructions as indicated by the stator slot to pole ratios shown in the left hand column of the table of FIG. 4. Thus, this third method of the invention is employed in magnetizing the permanent magnets of electric motor rotors only for those motors having the specific constructions indicated by the slot to pole ratios shown in the left hand column of FIG. 4. In addition, the polarity of the magnetizing electric current passed through the stator coils of Phase A and Phase B in the first stage of the method is not reversed for the second stage of the method. The magnetization current passes through the Phase A and Phase B coils for both the first and second stage. Apart from these differences, the polarization or magnetization of the rotor permanent magnets is done according to the same method of the second method embodiment of the invention, with the angle between the first position of the rotor and the second position of the rotor being determined as explained above.

The apparatus of the invention and its methods of use described above enable the magnetization of rotor permanent magnets in an electric motor in which the circumferential width dimension of each of the permanent magnet poles is larger than the circumferential width dimension of each of the stator coils. Although the apparatus and methods of the invention have been described above by reference to a particular apparatus and methods of using the apparatus, it should be understood that variations to the apparatus and the methods may be arrived at without departing from the scope of protection provided by the following claims.

What claimed is:

1. An apparatus for magnetizing permanent magnet poles of a rotor of an electric motor with the rotor mounted inside a plurality of stator windings of a stator of the motor, the apparatus comprising:

a magnetizer with means for connecting the magnetizer to the plurality of stator windings to supply a magnetizing current to the stator windings;

a motive device operatively connected to the rotor for selectively rotating the rotor relative to the stator; and, a magnetic flux sensing device positioned adjacent the stator for sensing a magnetic flux produced by the motive device rotating the rotor relative to the stator.

2. The apparatus of claim 1, further comprising:

a position sensor operatively connected to the rotor to sense a position of the rotor relative to the stator and emit signals representative of the position of the rotor.

3. The apparatus of claim 2, further comprising:

a controller that is operatively connected to the position sensor and the motive device to operate the motive device to selectively rotate the rotor relative to the stator in response to signals emitted by the position sensor.

4. The apparatus of claim 3, further comprising:

the controller being operatively connected to the magnetizer to send signals to the magnetizer that control the magnetizer to supply a magnetizing electric current to the stator in response to the controller signals.

5. The apparatus of claim 1, further comprising:

an electric current source with means for connecting the electric current source to the plurality of stator windings to produce a reluctance torque on the rotor by supplying electric current to the stator windings.

6. The apparatus of claim 1, further comprising:

a magnetic flux meter communicating with the magnetic flux sensing device for providing a visual indication of a magnetic flux sensed by the magnetic flux sensing device.

7. The apparatus of claim 1, further comprising:

each of the permanent magnet poles having a width dimension that extends around a portion of the rotor; and the plurality of stator windings include a plurality of winding coils and each winding coil has a width dimension around the rotor that is smaller than the width dimension of each permanent magnet pole.

8. A method of magnetizing permanent magnets on a rotor of an electric motor that is assembled for rotation in a plurality of stator windings of a stator of the electric motor, the method comprising:

rotating the rotor in the stator to a first position of the rotor relative to the stator;

applying a first magnetizing electric current to the windings of the stator with the rotor in the first position relative to the stator;

rotating the rotor in the stator to a second position of the rotor relative to the stator;

applying a second magnetizing electric current to the windings of the stator with the rotor in the second position relative to the stator; and, rotating the rotor in the stator and sensing a magnetic flux produced to determine whether the rotor was sufficiently magnetized.

9. A method of magnetizing permanent magnets on a rotor of an electric motor that is assembled for rotation in a plurality of stator windings of a stator of the electric motor, the method comprising:

applying a first magnetizing electric current to the stator windings with the rotor in a first position relative to the stator;

rotating the rotor in the stator to a second position of the rotor relative to the stator;

applying a second magnetizing electric current to the stator windings with the rotor in the second position relative to the stator; and, rotating the rotor in the stator and sensing a magnetic flux produced to determine whether the rotor was sufficiently magnetized.

10. The method of claim 9, further comprising:

stopping the first magnetizing electric current before rotating the rotor in the stator to the second position of the rotor relative to the stator.

11. The method of claim 9, comprising:

rotating the rotor in the stator no more than 90° from the first position of the rotor relative to the stator to the second position of the rotor relative to the stator.

12. The method of claim 9, further comprising:

rotating the rotor in the stator no more than 180° from the first position of the rotor relative to the stator to the second position of the rotor relative to the stator.

13. The method of claim 9, further comprising:

providing n number of permanent magnet poles on the rotor; and, rotating the rotor in the stator an angle of 120/n degrees from the first position of the rotor relative to the stator to the second position of the rotor relative to the stator.

14. The method of claim 9, further comprising:

providing n number of permanent magnet poles on the rotor; and, rotating the rotor in the stator an angle of 360(x)/n where x is an integer.

15. The method of claim 14, further comprising:

x being an integer from a group of integers consisting of 1, 2, 3, 4, 5, 6, and 7.

16. The method of claim 14, further comprising:

x being an integer from a group of integers consisting of 1, 3, 5 and 7.

17. The method of claim 16, further comprising:

the first magnetizing current having a first polarity and the second magnetizing current having a second polarity that is a reverse of the first polarity.

18. The method of claim 14, comprising:

x being an integer from a group of integers consisting of 2, 4 and 6.

19. The method of claim 18, further comprising:

the first magnetizing current and the second magnetizing current having a same polarity.

20. The method of claim 9, further comprising:

the first magnetizing current having a first polarity and the second magnetizing current having a second polarity that is a reverse of the first polarity.

21. The method of claim 9, further comprising:

the first magnetizing current and the second magnetizing current having a same polarity.

22. The method of claim 9, further comprising:

providing each permanent magnet pole of the rotor with a width dimension that extends around a portion of the rotor; and, providing the stator windings with stator coils that each have a width dimension around the rotor that is smaller than the width dimension of each permanent magnet.

* * * * *